United States Patent
Yhr et al.

(10) Patent No.: US 12,325,271 B2
(45) Date of Patent: Jun. 10, 2025

(54) METHOD FOR FORMING A VEHICLE COMBINATION

(71) Applicant: Volvo Truck Corporation, Gothenburg (SE)

(72) Inventors: Hamid Yhr, Gråbo (SE); Pär Blomqvist, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 860 days.

(21) Appl. No.: 17/540,392

(22) Filed: Dec. 2, 2021

(65) Prior Publication Data
US 2022/0185048 A1    Jun. 16, 2022

(30) Foreign Application Priority Data
Dec. 10, 2020 (EP) .................. 20213138

(51) Int. Cl.
*B60D 1/64* (2006.01)
*B62D 53/08* (2006.01)
(Continued)

(52) U.S. Cl.
CPC ........... *B60D 1/64* (2013.01); *B62D 53/0864* (2013.01); *B62D 53/0878* (2013.01);
(Continued)

(58) Field of Classification Search
None
See application file for complete search history.

(56) References Cited

U.S. PATENT DOCUMENTS

| 2018/0276609 A1 | 9/2018 | Seaman et al. |
| 2018/0313282 A1 | 11/2018 | Pati et al. |
| 2019/0064828 A1 | 2/2019 | Meredith et al. |

FOREIGN PATENT DOCUMENTS

| CN | 101479138 A | 7/2009 |
| CN | 203908783 U | 10/2014 |

(Continued)

OTHER PUBLICATIONS

Examination Report for European Patent Application No. 21209571. 5, mailed Jul. 5, 2023, 4 pages.

(Continued)

*Primary Examiner* — Peter D Nolan
*Assistant Examiner* — Michael F Whalen
(74) *Attorney, Agent, or Firm* — Withrow & Terranova, PLLC

(57) ABSTRACT

The present disclosure relates to a method for selecting and identifying a powered dolly vehicle for forming a vehicle combination with a primary vehicle and one or more trailers. The method includes receiving a request from a primary vehicle to select a powered dolly vehicle among a group of powered dolly vehicles based at least in part on a mission-characteristic for a vehicle combination; evaluating the operational characteristic of each one of the powered dolly vehicles based on the mission-characteristic; selecting a powered dolly vehicle among the group of powered dolly vehicles based at least in part on the evaluation; locating the selected powered dolly vehicle in the geographical area based at least in part on the identification information; and communicating the location of the selected powered dolly vehicle to the primary vehicle or operating the powered dolly vehicle to primary vehicle.

23 Claims, 4 Drawing Sheets

(51) Int. Cl.
  *B62D 59/04* (2006.01)
  *G05D 1/661* (2024.01)
  *H04W 4/40* (2018.01)

(52) U.S. Cl.
  CPC ............ *B62D 59/04* (2013.01); *G05D 1/661*
  (2024.01); *H04W 4/40* (2018.02)

(56) References Cited

FOREIGN PATENT DOCUMENTS

| | | | |
|---|---|---|---|
| CN | 106997520 A | 8/2017 | |
| CN | 107284376 A | 10/2017 | |
| EP | 1593552 A1 | 11/2005 | |
| JP | 2010154609 A | 7/2010 | |
| KR | 20160124959 A | 10/2016 | |
| WO | 2017207978 A1 | 12/2017 | |
| WO | 2020142829 A1 | 7/2020 | |
| WO | WO-2021160252 A1 * | 8/2021 | ........... B62D 13/005 |

OTHER PUBLICATIONS

Extended European Search Report for European Patent Application No. 20213138.9, mailed May 11, 2021, 8 pages.
First Office Action for Chinese Patent Application No. 202111491726.6, mailed Feb. 29, 2024, 18 pages.
Extended European Search Report for European Patent Application No. 21209571.5, mailed Apr. 8, 2022, 8 pages.

* cited by examiner

METHOD FOR FORMING A VEHICLE COMBINATION

RELATED APPLICATIONS

The present application claims priority to European Patent Application No. 20213138.9, filed on Dec. 10, 2020, and entitled "METHOD FOR FORMING A VEHICLE COMBINATION," which is incorporated herein by reference in its entirety.

TECHNICAL FIELD

The present disclosure relates to a method for selecting and identifying a powered dolly vehicle among a group of powered dolly vehicles in a geographical area for forming a vehicle combination with a primary vehicle. The present disclosure also relates to a wireless control system as well as a vehicle comprising parts of a wireless control system. The present disclosure is applicable to any type of vehicle combinations comprising at least a towing vehicle and a towed powered vehicle connected to each other. In particular, the present disclosure relates to heavy-duty vehicles, such as trucks and construction equipment, and more specifically to powered dolly vehicles in the form of autonomous powered dolly vehicles.

Although the disclosure will mainly be directed to a vehicle combination in the form of an autonomous truck and an autonomous dolly, it may also be applicable for other types of vehicles such as partly autonomous vehicle combinations, truck-powered trailer combinations etc.

BACKGROUND

In the field of heavy-duty vehicles there is an increasing demand for providing more efficient transportation vehicle systems, that may also be fully, or at least partly, autonomous. In an attempt to meet this demand, the operational capacity of heavy-duty vehicles can be increased by e.g. vehicle combinations with a plurality of vehicle units in the form of trailer units. As such, the vehicle combination is able to transport a substantive amount of material when driving from a first position to a second position.

Furthermore, some vehicle combinations may include one or more dolly vehicles to allow for additional trailers units to be towed by the same tractor unit. In this manner, the cargo transport ability may be further extended. Dolly vehicles can be provided in several different configurations, such as traditional unpowered dolly vehicles configured to connect with the tractor unit or another trailer. Other types of dolly vehicles may refer to powered dolly vehicles, such as electric-powered dolly vehicles, and/or steerable dolly vehicles. Dolly vehicles can also be configured to operate as partly or fully autonomous vehicles.

Although such vehicle combinations are commonplace today, there is still a challenge to form an appropriate vehicle combination comprising one or more dolly vehicles.

SUMMARY

It is an object of the present disclosure to at least partially overcome the above described deficiencies and to provide an improved method for forming a vehicle combination comprising a primary vehicle and a powered dolly vehicle.

According to a first aspect, there is provided a method for selecting and identifying a powered dolly vehicle among a group of powered dolly vehicles in a geographical area for forming a vehicle combination with a primary vehicle and one or more trailers, the method being implemented by one or more processors of a wireless control system, each one of the powered dolly vehicles having an associated distinguishable identification information and an operational characteristic, the method comprising:
receiving a request from the primary vehicle to select a powered dolly vehicle among the group of powered dolly vehicles based at least in part on a mission-characteristic for the vehicle combination;
evaluating the operational characteristic of each one of the powered dolly vehicles based on the mission-characteristic;
selecting a powered dolly vehicle among the group of powered dolly vehicles based at least in part on the evaluation;
locating the selected powered dolly vehicle in the geographical area based at least in part on the identification information; and
communicating the location of the selected powered dolly vehicle to the primary vehicle or operating the powered dolly vehicle to the primary vehicle.

The method of the present disclosure thus provides for an improved method for handling specific type of transportations of relatively large cargos by identifying and selecting a powered dolly vehicle among a group of dolly vehicles so as to better meet the demands associated with the transportation.

A further advantage of the present disclosure is to provide a more efficient transportation within a logistics area and also contribute to an improved transportation from and to the logistics area. The example embodiments are particularly suitable for more autonomous transportation networks, where at least parts of the transportation may either be partly or fully autonomous. In this type of systems, the present disclosure allows for forming the vehicle combination in an autonomous manner by means of a wireless control system communicating with a number of vehicle as so to form the most suitable vehicle combination for the given transportation.

The term "powered dolly vehicle", as used herein, may generally refer to a dolly vehicle operable as an independent vehicle unit and further configured to connect a pair of trailers to each other such that the trailers move with respect to each other when the vehicle combination is in motion. A powered dolly vehicle may generally include one or more driven axels and one or more steerable axles. A powered dolly vehicle is further self-powered. The powered dolly vehicle may be self-powered by an electric propulsions system, but may occasionally also be powered with another type of propulsion system, such as a hybrid propulsion system, including an internal combustion engine and an energy storage system in the form of a battery or a fuel cells system. According to one example embodiment, the powered dolly vehicle is an autonomous dolly vehicle. Autonomous dolly vehicles are self-powered vehicles and may provide both increased fuel efficiency and maneuverability. An autonomous dolly vehicle comprises one or more steerable axles for improved turning ability of the combination vehicle, since the dolly vehicle can be used to steer a second trailer as the vehicle combination turns in order to reduce the total area swept by the vehicle combination. According to at least one example embodiment, the powered dolly vehicle is an autonomous electric dolly vehicle.

The term "primary vehicle", as used herein, may generally refer to a towing vehicle, e.g. a tractor, cab, truck or another towing powered dolly vehicle. The primary vehicle may either be a conventional towing vehicle, a semi-autonomous towing vehicle or an autonomous towing vehicle. According to at least one example embodiment, the primary vehicle is an autonomous vehicle such as an electric vehicle, hybrid vehicle, in particular an autonomous towing vehicle, autonomous tractor unit of a truck or another autonomous dolly vehicle. Further, while the primary vehicle may generally be an electric vehicle, the primary vehicle may likewise be a partly electrical vehicle such as a hybrid vehicle. The primary vehicle may also be a vehicle comprising an internal combustion engine (ICE), such as diesel-type ICE, hydrogen-based ICE or the like, and further having an energy storage system, such as a battery or a fuel cells system.

The trailer may either be a passive trailer or a powered trailer, such as an electric-powered trailer.

It should also be noted that the vehicle combination may comprise additional vehicles and vehicle units, such as an additional autonomous dolly vehicle with corresponding trailers. Thus, the present disclosure is equally applicable for a vehicle combination comprising an arbitrary combination of vehicles, such as a third vehicle, a fourth vehicle, etc.

Further, it should be noted that the expression "autonomous vehicle", as used herein, should be interpreted broadly and relates to a vehicle that is operated in a fully or partially autonomous mode. In a partially autonomous vehicle, some functions can optionally be manually controlled (e.g. by a driver) some or all of the time. Further, a partially autonomous vehicle may be configured to switch between a fully-manual operation mode and a partially-autonomous and/or a fully-autonomous operation mode. Each one of the autonomous vehicles may include a control unit, e.g. an electronic control unit (ECU), typically provided as an onboard component of the vehicle. Further, each one of the vehicles may generally comprise a number of appropriate sensors for operating the corresponding vehicle in an autonomous manner. Such sensors may include sensors for determining what is occurring in a surrounding of the vehicle, for example including at least one of a radar, a LiDAR sensor and/or a camera. Other sensors for measuring speed, acceleration, inclination, torque, vehicle mass, etc. may be equally used in determining a desired general action plan to be performed by the autonomous vehicle.

It should be noted that the method may also include communicating the location of the selected powered dolly vehicle and its associated identification information and operational characteristic to the primary vehicle.

According to at least one example embodiment, the method further comprises selecting one or more trailers among a group of trailers based at least in part on the mission-characteristic for the vehicle combination and the selected powered dolly vehicle; communicating the location of the selected one or more trailers to the powered dolly vehicle, or the primary vehicle; and operating the powered dolly vehicle to couple with the one or more trailers. The above provision may also include the step of locating the one or more trailers in the geographical area.

Typically, the mission-characteristic of the vehicle combination comprises any one of an assignment instruction for the vehicle combination, a cargo space-requirement for the vehicle combination, a pick-up location of the cargo, a pick-up time for the cargo, a delivery time for the cargo, a delivery location of the cargo, and data indicating type of cargo. In addition, or alternatively, the mission-characteristic of the vehicle combination comprises data indicating type of primary vehicle.

According to at least one example embodiment, the method further comprises receiving data relating to environmental conditions. The data may refer to a weather forecast and may for example be received from a remote server, for example using a network connection, such as the Internet. The data may alternatively be received using a radio connection.

By way of example, the associated operational characteristic may comprise data indicating any one of a brake capacity of the powered dolly vehicle, brake system of the powered dolly vehicle, energy storage system capacity of the powered dolly vehicle, state of charge of the energy storage system of the powered dolly vehicle, and steering system of the powered dolly vehicle. In addition, or alternatively, the associated operational characteristic may comprise data indicating type of powered dolly vehicle. Such data may refer to the configuration of the dolly vehicle, the type of propulsion system of the dolly vehicle, the wheelbase of the dolly vehicle, the dimensions of the dolly vehicle, and the weight of the dolly vehicle.

Typically, the associated distinguishable identification information may comprise an identification component configurable to be updated by the one or more processors of a wireless control system. The identification component comprises data capable of distinguishing each one of the powered dolly vehicles from each other. The identification component may e.g. refer to a manufacturing ID, the ownership of the dolly vehicle and/or a technical specification of the dolly vehicle.

Optionally, the evaluating may comprise determining if at least one operational characteristic of at least one of the powered dolly vehicles fulfils the mission-characteristic, or is at least sufficient for fulfilling the mission-characteristic.

Optionally, the method may further comprise determining if at least one trailer among the number of trailers fulfils the mission-characteristic.

Optionally, evaluating the operational characteristic of each one of the powered dolly vehicles based on said mission-characteristic may further comprise generating a dolly vehicle requirement model based on a plurality of mission-characteristics, and further evaluating the operational characteristic of each one of the powered dolly vehicles by means of the dolly vehicle requirement model. The proposed dolly vehicle requirement model contributes to provide a more accurate mapping between the mission-characteristics and the operational characteristics.

The dolly vehicle requirement model may be configured to correlate the plurality of mission-characteristics with a plurality of operational characteristics of each one of the powered dolly vehicles. The method may comprise further evaluating the plurality of operational characteristics of each one of the powered dolly vehicles by means of the dolly vehicle requirement model.

The dolly vehicle requirement model may further comprise a ranking of the plurality of mission-characteristics.

The dolly vehicle requirement model may further comprise a ranking of a plurality of operational characteristics with respect to the received request.

The method may further comprise assessing, for each one of the powered dolly vehicles, its agreement with the dolly vehicle requirement model.

In addition, the method may further comprise generating a trailer requirement model based on the plurality of mission-characteristics.

According to at least one example embodiment, each one of the powered dolly vehicles comprising respective transceivers for receiving the request.

According to at least one example embodiment, the request is received at a remote-control source from the primary vehicle. Typically, the remote-control source may comprise a transceiver for receiving the request from the primary vehicle.

It should also be readily appreciated that the primary vehicle may comprise a transceiver. The transceivers of the primary vehicle, the powered dolly vehicles and the remote-control source are generally configured to receive and transmit data between each other.

The remote-control source may typically comprise a memory configurable to contain and store associated distinguishable identification information and operational characteristic of each one of the powered dolly vehicles. The remote-control source may either be located within the geographical area or adjacent the geographical area.

According to at least one example embodiment, the method further comprises receiving the request from the primary vehicle at the remote-control source when the primary vehicle arrives at the geographical area.

Typically, the primary vehicle comprises a memory configurable to contain any one of the associated distinguishable identification information and operational characteristic of each one of the powered dolly vehicles.

According to at least one example embodiment, the method further comprises obtaining the associated operational characteristic directly from powered dolly vehicles.

According to at least one example embodiment, the method further comprises controlling any one of the primary vehicle and the selected powered dolly vehicle to couple to each other so as to form the vehicle combination.

According to a second aspect, there is provided a computer program comprising program code, which when executed by one or more processors of a wireless control system, causes the one or more processors to perform operations comprising: receiving a request from the primary vehicle to select a powered dolly vehicle among the group of powered dolly vehicles based at least in part on a mission-characteristic for the vehicle combination; evaluating the operational characteristic of each one of the powered dolly vehicles based on the mission-characteristic; selecting a powered dolly vehicle among the group of powered dolly vehicles based at least in part on the evaluation; locating the selected powered dolly vehicle in the geographical area based at least in part on the identification information; and communicating the location of the selected powered dolly vehicle to the primary vehicle or operating the powered dolly vehicle to primary vehicle. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of magnetic, optical or solid-state type. Still within the scope of "data carrier", such memories may be fixedly mounted or portable.

According to a third aspect, there is provided a non-transitory computer-readable medium comprising instructions, which when executed by one or more processors of a wireless control system, causes the one or more processors to perform operations comprising: receiving a request from the primary vehicle to select a powered dolly vehicle among the group of powered dolly vehicles based at least in part on a mission-characteristic for the vehicle combination; evaluating the operational characteristic of each one of the powered dolly vehicles based on the mission-characteristic; selecting a powered dolly vehicle among the group of powered dolly vehicles based at least in part on the evaluation; locating the selected powered dolly vehicle in the geographical area based at least in part on the identification information; and communicating the location of the selected powered dolly vehicle to the primary vehicle or operating the powered dolly vehicle to primary vehicle.

According to a fourth aspect, there is provided a wireless control system for identifying and selecting a powered dolly vehicle among a group of powered dolly vehicles in a geographical area for forming a vehicle combination with a primary vehicle and one or more trailers, each one of the powered dolly vehicles having an associated distinguishable identification information and an operational characteristic, the wireless control system comprising a memory that stores a set of instructions and one or more processors which use the instructions from the set of instructions to:

receive a request from the primary vehicle to select a powered dolly vehicle among the group of powered dolly vehicles based at least in part on a mission-characteristic for the vehicle combination;

evaluate the operational characteristic of each one of the powered dolly vehicles based on the mission-characteristic;

select a powered dolly vehicle among the group of powered dolly vehicles based at least in part on the evaluation;

locate the selected powered dolly vehicle in the geographical area based at least in part on the identification information; and communicate the location of the selected powered dolly vehicle to the primary vehicle or operating the powered dolly vehicle to primary vehicle.

Typically, the wireless control system may comprise a communication interface operably coupled to the one or more processors for receiving instructions and for transmitting the location of the selected powered dolly vehicle to the primary vehicle.

Further effects and features of the second, third and fourth aspects are largely analogous to those described above in relation to the first aspect.

According to at least one example embodiment, the wireless control system is configured to control communication between the primary vehicle, the dolly vehicle(s) and the trailer(s). According to at least one example embodiment, the wireless control system is configured to control communication between the primary vehicle, the dolly vehicle(s), the trailer(s) and the remote-control source. The wireless control system may typically comprise a control unit comprised in each one of the vehicles of the vehicle combination. Each one of the control units may generally comprise a corresponding processor. While parts of the wireless control system and the processors may be comprised at different locations of the vehicle combination depending on type of vehicles of the vehicle combination, at least one the example embodiment incorporates at least one control unit in each one of the vehicles making up the vehicle combination. Hence, the wireless control system may include one or more control units comprised on-board each one of the vehicles of the vehicle combination. The wireless control system and each one of the corresponding control units may include a microprocessor, microcontroller, programmable digital signal processor or another programmable device. The wireless control system and each one of the corresponding control units may comprise modules in either hardware or software, or partially in hardware or software and communicate using known transmission buses such as CAN-bus and/or wireless communication capabilities. The processor may be a general purpose processor or a specific processor. The wireless control system and each one of the corresponding control units typically comprises a non-transitory memory for storing computer program code and data upon. Thus, the wireless control system and control units may be embodied by many different constructions. While the example embodiments of the wireless control system described above can include one or more control units being integral parts thereof, it is also possible that the one or more control units may be separate parts of the vehicle combination, and/or arranged remote from the vehicle combinations and in communication with each one of the vehicles of the vehicle combination. Parts of the control system may also be provided in the form of a cloud server arranged in networked communication with the vehicle combination. Parts of the control system may also be implemented using a cloud server being network connected to an electronic control unit (ECU) comprised with the vehicle combination.

Optionally, the wireless control system may also comprise a remote-control unit in the form of the remote-control source, such as a control tower in the geographical area. Optionally, any one of the control units may be in communication with the remote-control unit or server via a wireless link. This remote-control unit may be connected to a communication interface, such as a communications network defined by the third-generation partnership program, 3GPP. Examples of such networks include 4G, 5G and 6G communication networks, as well as networks in the 802.11 family, in particular 802.11p. The remote-control unit may, e.g., be comprised in a control tower arranged to control dolly vehicles in a cargo terminal. In this case, the dolly vehicle is configured to enter into a slave mode configuration and receive requests from the control tower in a way similar to when it is connected to a master towing vehicle.

According to a fifth aspect, there is provided a vehicle for forming a vehicle combination with a powered dolly vehicle and one or more trailers, comprising a memory that stores a mission-characteristic for the vehicle combination and one or more processors which use the mission-characteristic to:
  select a powered dolly vehicle among a group of powered dolly vehicles based at least in part on the mission-characteristic for the vehicle combination, each one of the powered dolly vehicles having an associated distinguishable identification information and an operational characteristic;
  evaluate the operational characteristic of each one of the powered dolly vehicles based on the mission-characteristic;
  select a powered dolly vehicle among the group of powered dolly vehicles based at least in part on the evaluation;
  locate the selected powered dolly vehicle in the geographical area based at least in part on the identification information; and
  communicate the location of the selected powered dolly vehicle to the primary vehicle or operating the powered dolly vehicle to vehicle.

Effects and features of fifth aspect are largely analogous to those described above in relation to the other aspects.

Further features of, and advantages will become apparent when studying the appended claims and the following description. The skilled person will realize that different features may be combined to create embodiments other than those described in the following, without departing from the scope of the present disclosure.

In yet another aspect, or example, there is provided a method for selecting and identifying a powered trailer among a group of powered trailers in a geographical area for forming a vehicle combination with a primary vehicle, the method being implemented by one or more processors of a wireless control system, each one of the powered trailers having an associated distinguishable identification information and an operational characteristic, the method comprising:
  receiving a request from the primary vehicle to select a powered trailer among the group of powered trailers based at least in part on a mission-characteristic for the vehicle combination; —evaluating the operational characteristic of each one of the powered trailers based on the mission-characteristic; —selecting a powered trailer among the group of powered trailers based at least in part on the evaluation;
  locating the selected powered trailer vehicle in the geographical area based at least in part on the identification information; and—communicating the location of the selected powered trailer to the primary vehicle.

In a method for forming a vehicle combination with an autonomous truck as the primary vehicle, the method may further comprise operating the primary vehicle to the powered trailer. Typically, the method may further comprise the operation of coupling the autonomous truck with the powered trailer.

By way of example, the powered trailer associated operational characteristic may comprise data indicating any one of a brake capacity of the powered trailer, brake system of the powered dolly vehicle, energy storage system capacity of the powered dolly vehicle, state of charge of the energy storage system of the powered dolly vehicle, and steering system of the powered dolly vehicle. In addition, or alternatively, the powered trailer associated operational characteristic may comprise data indicating type of powered trailer. Such data may refer to the configuration of the powered trailer, the type of propulsion system of the powered trailer, the wheelbase of the powered trailer, the dimensions of the powered trailer, and the weight of the powered trailer.

Typically, the powered trailer associated distinguishable identification information may comprise an identification component configurable to be updated by the one or more processors of the wireless control system. The identification component comprises data capable of distinguishing each one of the powered trailers from each other. The identification component may e.g. refer to a manufacturing ID, the ownership of the powered trailer and/or a technical specification of the powered trailer.

It should also be readily appreciated that the method according to the yet another aspect may be combined with any one of the example embodiments, features and functions as described in relation to the first, second, third, fourth and fifth aspects. Moreover, the effects and features of the yet another aspect are largely analogous to those described above in relation to the other aspects.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
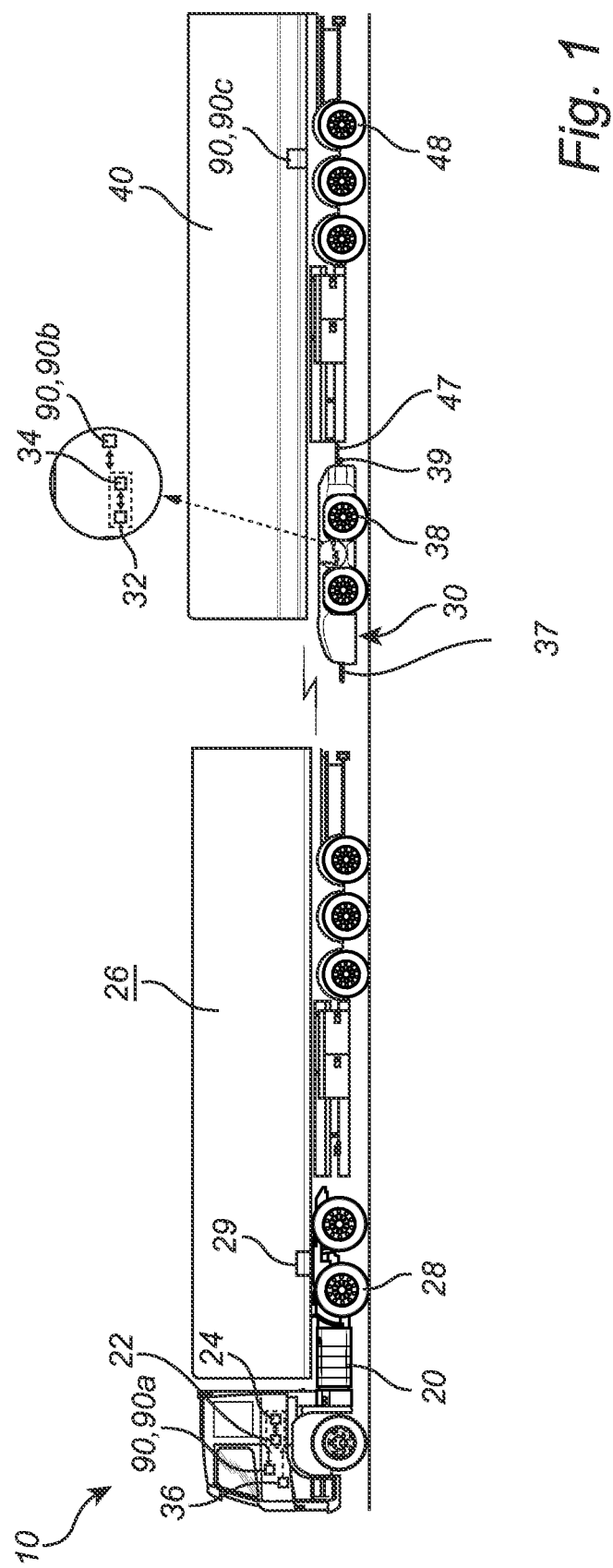
FIG. 1 is a lateral side view illustrating an example embodiment of a vehicle combination in the form of a primary vehicle and a powered dolly vehicle, in which the primary vehicle is an autonomous truck and the powered dolly vehicle is an autonomous dolly vehicle coupled to a trailer.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Referring now to the drawings and to FIG. 1 in particular, there is depicted an exemplary vehicle combination 10 in the form of a primary vehicle 20 configured to be coupled to a powered dolly vehicle 30. The vehicle combination is particularly suitable for cargo transport where the herein disclosed techniques can be applied with advantage. In FIG. 1, the vehicle combination 10 comprises a primary vehicle in the form of an autonomous truck 20 and a secondary vehicle in the form of an autonomous dolly vehicle 30. Moreover, the autonomous truck 20 here comprises a tractor unit and a semi-trailer 26. However, the autonomous truck 20 may likewise be operated without a semi-trailer, as illustrated in e.g. FIG. 2. Further, the autonomous dolly vehicle 30 is coupled to a trailer 40. The trailer 40 is here a conventional non-powered trailer, but may likewise be an electrified trailer. In FIG. 1, the vehicle combination 10 is illustrated in an uncoupled arrangement between the autonomous truck 20 and the autonomous dolly vehicle 30. It should be readily appreciated that the vehicle combination may be provided in several different ways. By way of example, the primary vehicle may be provided in the form of an autonomous dolly vehicle and the powered dolly vehicle in the form of another autonomous dolly vehicle, each one of the dollies having corresponding trailers. Generally, each one of the vehicles of the vehicle combination comprises corresponding control units 90a, 90b, 90c forming parts of a wireless control system 90, as will be further described in relation to FIGS. 2 to 4. The wireless control system may of course also be implemented in other types of vehicle combinations.

For ease of reference, the autonomous truck may herein simply be denoted as the truck, while the autonomous powered dolly vehicle may simply be denoted as the powered dolly vehicle, or the dolly vehicle.

While the propulsion systems of the vehicles of the vehicle combination may be provided in several different ways, the primary propulsion system of each one of the truck 20 and the dolly vehicle 30 is here an electric propulsion system. Hence, each one of the vehicles 20 and 30 comprises a corresponding electric machine 22 and 32 and a corresponding energy storage system, ESS, 24 and 34. If the trailer 40 is an electrified trailer, the trailer may comprise a corresponding electric machine and ESS. By way of example, the ESS is a high voltage battery, as is commonly known in the art.

Moreover, each one of the vehicles 20, 30 and trailers 40 comprises at least one pair of wheels 28, 38 and 48, but may often include a number of additional pair of wheels. If the vehicles 20 and 30 are autonomous vehicles, at least some of the pair of wheels of each vehicle are driven by means of the electric machines. It may also be noted that the semi-trailer 26 may have corresponding wheels. It should be readily appreciated that several different configurations may be conceivable depending on type of vehicle combination. By way of example, the truck may likewise be a diesel-type truck with an internal combustion engine, or a hybrid truck including an internal combustion engine and the electric machine, where the ESS is provided in the form of a 48-voltage system rather than a high voltage system.

The vehicles and trailers of the vehicle combination 10 can be mechanically coupled to each other in several different ways, e.g. by an articulated coupling. By way of example, as illustrated in FIG. 1, the truck 20 comprises a fifth wheel configuration 29 for the semi-trailer 26. Similarly, the dolly vehicle 30 comprises a front drawbar 37 for connecting with the trailer 26 and a rear drawbar 39 for connecting with drawbar 47 of the trailer 40. Accordingly, the dolly vehicle 30 is configured to connect a pair of trailers 26 and 40 to each other such that they move with respect to each other when the dolly vehicle 30 is in motion.

In other words, the vehicle combination in FIG. 1 illustrates an arrangement of a number of vehicles so as to extend the cargo transport capability of the vehicle combination.

Figure 2:
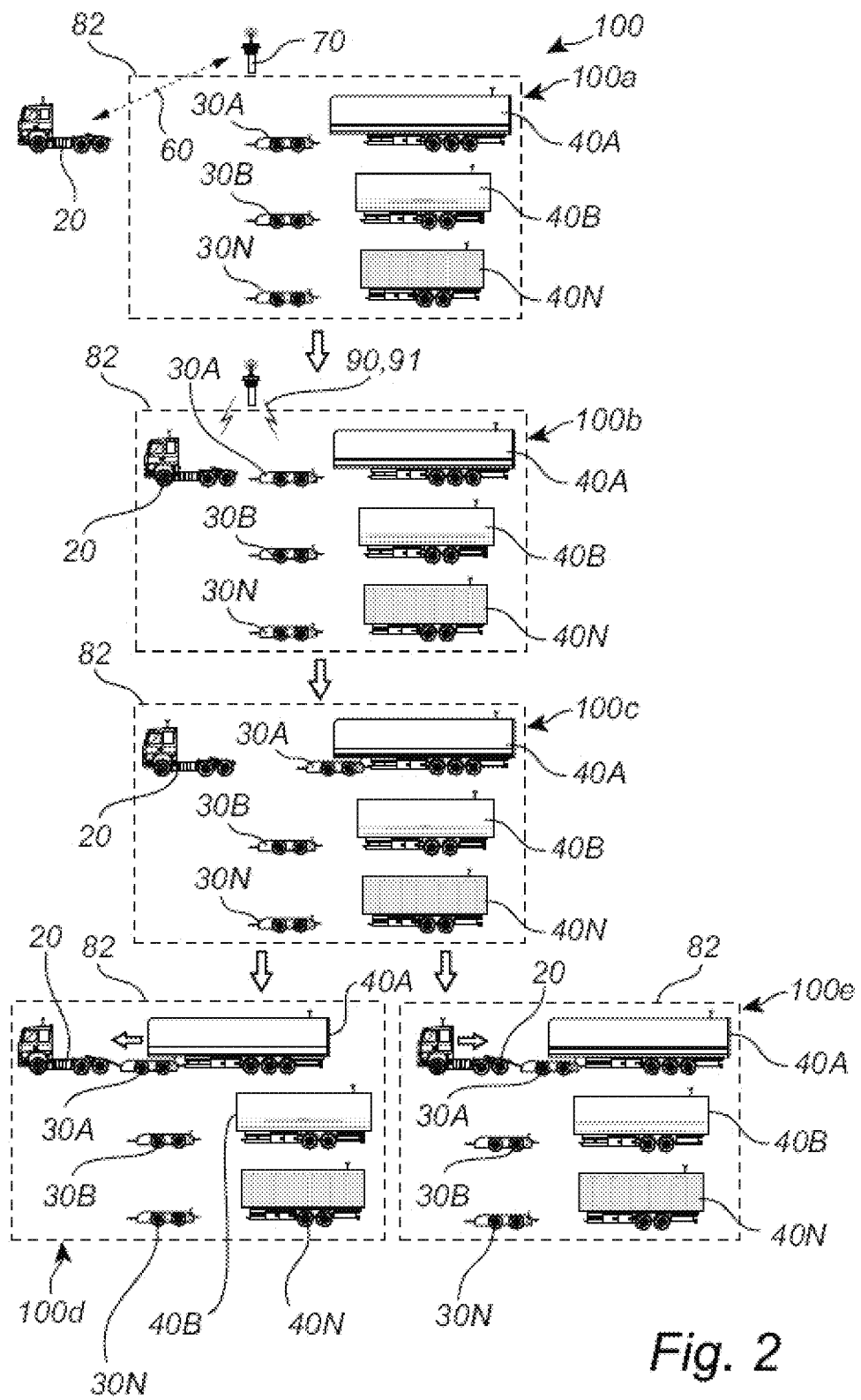
FIG. 2 schematically shows parts of a wireless control system for performing a number of operations so as to form the vehicle combination in FIG. 1 according to an example embodiment.

Turning now to FIG. 2, there is depicted a number of sequences for forming a vehicle combination 10 as described in relation to FIG. 1. For reasons of simplifying the illustrations, the semi-trailer 26 in FIG. 1 has been omitted from the illustrations in FIG. 2. However, it should be noted that the example embodiment of the vehicle combination may both be applicable for a truck with a semi-trailer and a truck without a semi-trailer. Further, throughout the description of the disclosure, the truck 20 may simply be denoted as the truck 20, while the dolly vehicle 30, may simple be denoted as the powered dolly vehicle or as the dolly vehicle. The number of sequences in FIG. 2 for forming the vehicle combination will be described in parallel with reference to FIG. 3, which is a flow-chart of one example embodiment of a method according to the present disclosure. In FIG. 2, the number of sequences refers to reference numerals 100, 100a to 100d, for ease of understanding the procedure for forming a vehicle combination.

FIG. 2 illustrates the truck 20 approaching a geographical area 82, which may e.g. a defined logistics area with defined boundaries, as indicated by the dashed rectangle in FIG. 2. As illustrated in the first sequence 100a, there is located a number of dolly vehicles 30A to 30N and a number of trailers 40A to 40N in the geographical area 82. The dolly vehicles 30A to 30N and the trailers 40A to 40N here corresponds to the vehicles as described in FIG. 1 above. In FIG. 2, the number of dolly vehicles is three and the number of trailers is three for easy of describing one example embodiment. However, the number of dolly vehicles and trailers may vary significantly depending on type of logistics area.

Moreover, the geographical area 82 comprises a remote-control source, which is here provided in the form of a control tower 70. The control tower 70 is here a part of the wireless control system 90 in combination with the control units, comprised on each one of the vehicles. In other words, each one of the truck 20, dolly vehicles 30A to 30N and trailers 40A to 40N comprises a corresponding control unit for communicating with each other and with control tower 70.

The communication between the truck 20, dolly vehicles 30A to 30N, trailers 40A to 40N and the control tower 70 is performed via a communication interface, indicated by reference numeral 91. Thus, the wireless control system 90 comprises a communication interface 91. The communication interface 91 is here performed by a wireless link, such as a communications network defined by the third-generation partnership program, 3GPP. Examples of such networks include 4G, 5G and 6G communication networks, as well as networks in the 802.11 family, in particular 802.11p. In other words, parts of the wireless control system 90 are also arranged as a component of the vehicle combination 10 by means of one of more of the control units comprised with the vehicles of the vehicle combination. The number of control units making up the wireless control system may vary depending on type of vehicle combination.

Each one of the control units, e.g. control units 90A to 90C (see FIG. 1), and the control tower 70 making up the wireless control system 90 may generally comprise a corresponding processor. Each one of the processors may each include a microprocessor, microcontroller, programmable digital signal processor or another programmable device. Each one of the processors may also, or instead, each include an application specific integrated circuit, a programmable gate array or programmable array logic, a programmable logic device, or a digital signal processor. Where each one of the processors includes a programmable device such as the microprocessor, microcontroller or programmable digital signal processor mentioned above, the processor may further include computer executable code that controls operation of the programmable device. It should be understood that all or some parts of the functionality provided by the one or more processors may be at least partly in communication with the described components of the wireless control system 90.

The one or more processors are in communication with each other via the communication interface 91. Typically, each one of the dolly vehicles 30A to 30N comprises respective transceivers (although not shown) for receiving the request.

Thus, the communication interface 91 provides for transmitting data between the truck, dolly vehicles, trailers and the control tower. Such arrangement of communication can be established in several different ways. By way of example, the truck 20 is equipped with a transceiver (not shown) configured to establish a communication with another transceiver comprised with any one of the dolly vehicles, trailers and control tower. Each transceiver may comprise a transmitter side and a receiver side or may constitute a combined device. Each transceiver may comprise or be connected to at least one antenna, which may be mounted on top of the corresponding or underneath, or in a different suitable position. The antenna may comprise multiple antenna elements, especially on the receiver side.

Moreover, each one of the dolly vehicles 30A to 30N has an associated distinguishable identification information and an operational characteristic. Typically, the corresponding control units of the dolly vehicles comprise respective memories configured to contain the identification information and the operational characteristic. In addition, or alternatively, the control unit of the control tower comprises a memory configured to contain the identification information and the operational characteristic. In addition, or alternatively, the control unit 90A of the truck 20 comprises a memory configured to contain the identification information and the operational characteristic.

The identification information and the operational characteristic are used for selecting an appropriate dolly vehicle for the truck 20, as will be further described herein. The operational characteristic here comprises data indicating any one of a prevailing brake capacity, brake system of the powered dolly vehicle, energy storage system capacity of the powered dolly vehicle, state of charge, SOC, of the energy storage system of the powered dolly vehicle, and steering system of the powered dolly vehicle. Examples of types of brake systems may be mechanical brake system electrochemical brake systems, electric brake systems, e.g. eddy current brake system etc. Examples of types of steering systems may be dynamic steering systems, such as steering systems including hub motors on each wheel of the dolly vehicle (also denoted as self-steering systems). A self-steering system is arranged to permit the dolly vehicle to follow the truck by steering its own wheels. A self-steering system may generally comprise an electric motor, a hydraulic steering gear, a control unit and a range of sensors both inside and around the vehicle. A self-steering system is different to dolly vehicle only being equipped with a towbar connection. The energy storage system capacity may refer to a battery, fuel cell system etc. Hence, the state of charge of the energy storage system may refer to the state of charge of the battery or the state of charge of the fuel cell system (i.e. the ESS). As such, the operational characteristic comprises data for indicating type of dolly vehicle and possibly also the operational status (e.g. SOC) of the dolly vehicle.

The identification information comprises an identification component for identifying the type of dolly vehicle. The identification component may refer to ownership of the dolly vehicle. In addition, or alternatively, the identification component may refer to a technical specification of the dolly vehicle.

The identification component, and also original conditions of the operational characteristics can be provided to the dolly vehicle at the manufacturing time. That is, all the data/specification of the dolly vehicle is entered in the memory of the control unit. Analogously, the ownership of the dolly vehicle might be entered when it is manufactured, but also later during use of the dolly vehicle.

Alternatively, or in addition, the identification information and the operational characteristic may be updated during operation of the dolly vehicles. Alternatively, or in addition, further data might be added by the control tower 70 or owner of the vehicles during operation of the dolly vehicles. For example, the identity of one or more dolly vehicles might be changed or extended in view of operations of the owner. Such update may also include specific authorized information defined by the owner or any regulatory institute. The information component may therefore be provided in the form of a confidential data component.

To this end, the memories of the control units 90a to 90c and the control tower 70 are generally configurable to be updated by the one or more processors of the wireless control system. In the example embodiment in FIG. 2, the memory of the control tower 70 is configurable to contain and store the associated distinguishable identification information and operational characteristic of each one of the dolly vehicles 30A to 30N. By way of example, the memory of the control tower 70 comprises a table containing all the data/specification for each dolly vehicle. The dolly vehicles might belong to the company/authority which owns the logistics area or belong to another company/authority which cooperates or share resources with the owner of the logistics area. Further, depending on whether the logistics area is alone or part of a bigger company/authority with perhaps a centralized system, the following scenarios may be conceivable: (a) When a new dolly vehicle has been purchased, all the data/specification about the dolly vehicle is entered into the memory of the control tower. (b) Alternatively, in case of a company with more than one logistics area, the control tower might receive the information via its communication network. (c) Alternatively, the control tower may also have the possibility of uploading the data/specification of a given dolly vehicle upon its arrival to a logistics area.

Turning again to the function of the wireless control system 90, the system 90 is configured to identify and select a suitable dolly vehicle among the group of dolly vehicles 30A to 30N in the geographical area 82 for forming a suitable vehicle combination with the truck 20 and, optionally, with one or more trailers 40A to 40N.

Figure 3:
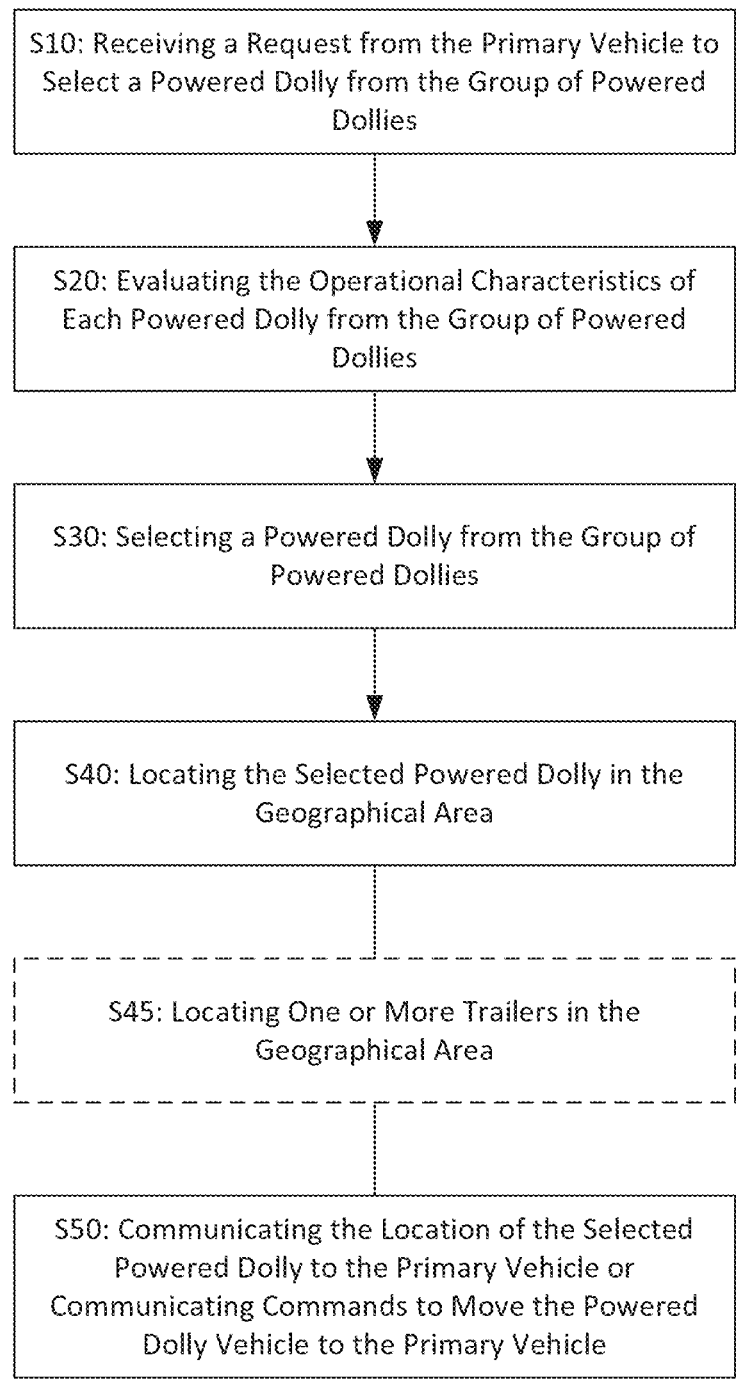
FIG. 3 is a flow chart of a method for forming the vehicle combination in FIG. 1, according to an example embodiment.

One example of a number of sequences for forming one type of vehicle combination will now be further described in relation to FIG. 2 in combination with FIG. 3, which shows a flow-chart of the steps of a method performed by the wireless control system 90 for forming the vehicle combination.

Initially, when the truck 20 arrives at the geographical area 82, as indicated in 100a, the truck 20 sends a request 60 to the control tower 70 containing a mission-characteristic for the vehicle combination. The request is transmitted over the communication interface 90 to the control tower 70 according to the above description, i.e. the transceiver of the remote-control source here receives the request from the truck 20. The control tower 70 receives the request 60 from the truck 20 and generally also a geographical position of the truck 20. The request comprises instructions to select a dolly vehicle among the group of powered dolly vehicles 30A to 30N, based on the mission-characteristic for the vehicle combination.

The mission-characteristic here comprises any one of an assignment instruction for the vehicle combination, a cargo space-requirement for the vehicle combination, a pick-up location of the cargo, a pick-up time for the cargo, a delivery time for the cargo, a delivery location of the cargo, data indicating type of cargo.

The pick-up location generally contains route specific data for the mission. The data indicating type of cargo may e.g. include information on the chemical composition of the cargo, such as the state of the substance (e.g. solid, liquid, gas), if the cargo contains hazardous content and/or if there are any cooling requirements. The data may also indicate the weight of the cargo.

In addition, or alternatively, the mission-characteristic comprises data indicating type of truck 20, e.g. if the truck arrives or will be leaving with or without a semi-trailer.

Optionally, the request may also comprise data relating to environmental conditions, such as a weather forecast etc.

Next, as partly indicated by 100b in FIG. 2, the wireless control system 90 is configured to evaluate the operational characteristic of each one of the dolly vehicles 30A to 30N based on the mission-characteristic. By way of example, the evaluating sequence comprises determining if at least one operational characteristic of at least one of the dolly vehicles 30A to 30N fulfils the mission-characteristic, or is at least sufficient for fulfilling the mission-characteristic.

The evaluation may also be performed in other ways, e.g. by modelling a dolly vehicle requirement profile of a desired dolly vehicle. In this type of evaluation sequence, the wireless control system 90 is configured to generate a dolly vehicle requirement model based on a plurality of mission-characteristics. Further, the wireless control system 90 is configured to evaluate the operational characteristic of each one of the powered dolly vehicles 30A to 30N by means of the dolly vehicle requirement model.

The dolly vehicle requirement model is here configured to correlate the plurality of mission-characteristics with a plurality of operational characteristics of each one of the powered dolly vehicles. The mission-characteristics and the operational characteristics as described above are generally used in the dolly vehicle requirement model. However, other sets of mission-characteristics and operational characteristics may also be conceivable. In addition, the dolly vehicle requirement model here also comprises environmental conditions. Typically, the dolly vehicle requirement model may also comprise route information, as described above.

Subsequently, the wireless control system 90 is configured to evaluate the plurality of operational characteristics of each one of the powered dolly vehicles by means of the dolly vehicle requirement model. Finally, the wireless control system 90 is configured to perform the evaluation by assessing, for each one of the powered dolly vehicles, each one of the powered dolly vehicles agreement with the dolly vehicle requirement model. By way of example, the assessment is performed by determining if at least one of the dolly vehicles 30A to 30N fulfils the characteristics and conditions defined by the dolly vehicle requirement model, or is at least sufficient for fulfilling parts of the mission-characteristics contained in the dolly vehicle requirement model. In another example, the assessment is performed by determining a level of fulfilment between a dolly vehicle's operational characteristics and the characteristics and conditions defined by the dolly vehicle requirement model.

In addition, or alternatively, the dolly vehicle requirement model may comprise a ranking of the plurality of mission-characteristics. Analogously, the dolly vehicle requirement model may further comprise a ranking of a plurality of operational characteristics with respect to the received request. By way of example, the dolly vehicle requirement model comprises a ranking of a plurality of operational characteristics with respect to the mission-characteristics of the request.

Accordingly, the dolly vehicle requirement model may include a number of relevant data for making an appropriate selection, e.g. a list of the all the dolly vehicles 30A to 30N in the geographical area 82, including their operational characteristics.

Merely as an example, the control unit 90a of the truck 20 is configured to evaluate the group of dolly vehicles 30A to 30N based on the mission-characteristics of the dolly vehicle requirement model so as to determine which one of the dolly vehicles that is most capable of the mission, e.g. by ranking the mission-characteristics of the dolly vehicle requirement model and correlating these requirements in view of the needed brake capacity, desired steering system, or required level of motion management. The needed brake capacity, desired steering system and required motion management can be determined in several different ways, as is commonly known in the art. By way of example, the needed brake capacity, desired steering system and required motion management can be determined based on previously entered specifications about weight of the cargo, size of the cargo and/or state of the substance of the cargo.

The wireless control system 90 is generally configured to process data relating to the request, e.g. processing data relating to the mission-characteristics for the vehicle combination from the received request mission, and then, on the basis of the received request, to further determine and generate a dolly vehicle requirement model adapted to evaluate the group of dolly vehicles 30A to 30N, as mentioned above.

In other words, the dolly vehicle requirement model is used to define a number of relationships between the mission-characteristics and the operational characteristics. A dolly vehicle requirement model of this kind can be determined by practical experimentation, analytical derivation, computer simulation, or a combination of the above. In practice, the dolly vehicle requirement model may be represented by a look-up table (LUT) indexed by the mission-characteristics and the operational characteristics, or as a set of coefficients describing a polynomial or the like. The set of coefficients are selected based on the mission-characteristics, and where the polynomial then describes the relationships between the mission-characteristics and the operational characteristics. The dolly vehicle requirement model is generally a software-based model comprised in the wireless control system.

As mentioned above, the dolly vehicle requirement model may be implemented as a look-up table or other type of function. The dolly vehicle requirement model is parameterized, i.e., defined, by one or more the mission-characteristics. This means that the function itself varies in dependence of the mission-characteristics. The dolly vehicle requirement model can be used to model various relationships, as exemplified above, such as a relationship or mapping between the pick-up location type of cargo, the weight of the cargo and the needed braking system, needed energy storage system capacity, and needed state of charge of the energy storage system.

By way of example, the dolly vehicle requirement model may be implemented so as to evaluate and subsequently select a dolly vehicle with a more simple brake system and steering system for a mission request relating to delivery of cargo in an urban environment, while the dolly vehicle requirement model may select another dolly vehicle with a more advanced brake system and steering system (such as a dynamic steering system with hub motors on each wheel, also denoted as a self-steering system) for a mission request relating to delivery of cargo to location in a mountain environment.

It is appreciated that the present disclosure is not limited to any particular form of dolly vehicle requirement model structure. Rather, it is appreciated that many different types of mathematical and/or experimentally based functions and mappings can be used as the dolly vehicle requirement model.

This dolly vehicle requirement model will then provide a more accurate mapping between the mission-characteristics and the operational characteristics.

Subsequently, as partly indicated by 100c, the wireless control system 90 selects the dolly vehicle 30A among the group of dolly vehicles based on the evaluation.

The next action of the procedure may then vary depending on type of dolly vehicle and type of logistics area. By way of example, if it is a fully automated dolly vehicle, the wireless control system 90 continues to locate the selected dolly vehicle in the geographical area 82 based on the identification information. In order to geographical locate the dolly vehicle 30A in the geographical area 82, the wireless control system 90 may also use commonly known GPS functionality. That is, the dolly vehicles may generally comprise corresponding GPS tracking devices, or any other suitable vehicle tracking system, as is commonly known in the art.

Optionally, in particular if the dolly vehicle is an autonomous dolly vehicle, the dolly vehicle will be operated to couple with a trailer 40A, as indicated by reference numeral 100c. In an optional extended version of the example embodiment in FIG. 2, the wireless control system 90 is configured to select a trailer among a group of trailers 40A to 40N based on the mission-characteristic for the vehicle combination and the previously selected dolly vehicle. In this extended version of the example embodiment in FIG. 2, the wireless control system 90 is typically configured to communicate the location of the selected trailer 40A to the selected dolly vehicle 30A, and subsequently operate the dolly vehicle 30A to couple with trailer 40A. Typically, the trailer comprises a GPS tracking device for communicating its location to the control tower or directly to the dolly vehicle. Hence, the wireless control system is generally configured to subsequently locate the trailer in the geographical area and communicate its location to the dolly vehicle.

The next action of the procedure may also vary depending on type of dolly vehicle and type of logistics area. By way of example, if it is a fully automated dolly vehicle, the wireless control system 90 is configured to operate the dolly vehicle 30A to the truck 20, as illustrated by reference numeral 100d. The dolly vehicle 30A is generally operated as any type of autonomous vehicle commonly known in the art, where sensor information from various sensors on the autonomous dolly vehicle is analysed and used for guiding the autonomous dolly vehicle 30A through the geographical area; and communicating suitable instructions based on the information to the truck 20. In general, both the truck and the dolly vehicle may use so-called object detection, GPS together with e.g. LiDAR sensors to operate within the geographical area 82.

Alternatively, if the dolly vehicle is a partly-autonomous dolly vehicle, the wireless control system 90 is configured to locate the selected dolly vehicle 30A in the geographical area 82 based on the identification information and communicate the location of the selected dolly vehicle 30A to the truck 20 such that the truck 20 can drive to the dolly vehicle 30A in the geographical area 82, as illustrated by reference numeral 100e. It should be noted that the above sequence may likewise be performed even for automated dolly vehicles.

Further, it may be noted that the wireless control system 90 may operate the vehicle combination in a common way when the truck 20 and the dolly vehicle 30A are in a coupled configuration, as e.g. indicated in 100d of FIG. 2. In other situations, when the truck 20 and the dolly vehicle 30A are in an uncoupled mode, the dolly vehicle 30A may generally be operated by its corresponding control unit and the truck 20 by its corresponding control unit 90b, i.e. when the truck 20 an the dolly vehicle 30A are operated independent from each other, which is e.g. indicated in 100b in FIG. 2.

When the truck 20 and the dolly vehicle 30 form the vehicle combination 10, the control unit 90a of the truck 20 is generally the "master", while the dolly vehicle 30 is configured to be autonomous when disconnected from the truck etc. Hence, as long as the truck 20 is connected to the dolly vehicle 30A, the truck 20 acts as master, while the one or more dolly vehicles operate in a slave mode. When the dolly vehicle 30A decouples from the "master" control unit 90a, however, the slave mode in the dolly vehicle 30 is shifted to master mode, and the dolly vehicle is operable as an autonomous vehicle. The communication between the master and slave mode control units 90*a* and 90*b* is either via wireless connection such as a unit to unit (U2U) communication or via some form of wired communication such as Ethernet communication between units.

In other words, it should be readily appreciated that the wireless control system 90 may either control the truck 20 to couple with the dolly vehicle 30A and subsequently with the trailer 40A or control the dolly vehicle 30A to couple with the trailer 40 (as illustrated by reference numeral 100*d*) and subsequently control the truck 20 and/or the dolly vehicle to couple with each other, so as to form the vehicle combination 10.

In order to sum up, reference is made to FIG. 3, which is a flowchart of a method 200 for forming the above described vehicle combination according to an example embodiment. In particular, the method 200 is configured to select and identify a powered dolly vehicle among a group of powered dolly vehicles in the geographical area 82 for forming the vehicle combination 10. The method is typically implemented by one or more of the processors of the wireless control system 90, as described in relation to FIG. 2. One example embodiment of the method here comprises:

receiving S10 a request 60 from the primary vehicle to select a powered dolly vehicle among the group of powered dolly vehicles based at least in part on a mission-characteristic for the vehicle combination;

evaluating S20 the operational characteristic of each one of the powered dolly vehicles based on the mission-characteristic;

selecting S30 a powered dolly vehicle among the group of powered dolly vehicles based at least in part on the evaluation;

locating S40 the selected powered dolly vehicle in the geographical area based at least in part on the identification information; and communicating S50 the location of the selected powered dolly vehicle to the primary vehicle or operating the powered dolly vehicle to primary vehicle.

Optionally, the method further comprises selecting S45 one or more trailers among a group of trailers based at least in part on the mission-characteristic for the vehicle combination and the selected powered dolly vehicle; communicating the location of the selected one or more trailers to the powered dolly vehicle; and operating the powered dolly vehicle to couple with the one or more trailers.

The step S45 may also comprise the step of locating one or more trailers in the geographical area 82, as mentioned above in relation to FIG. 2. It should be noted that step S45 may either be performed prior to step S50 or subsequent to step S50, as also further described in relation to FIG. 2.

Figure 4:
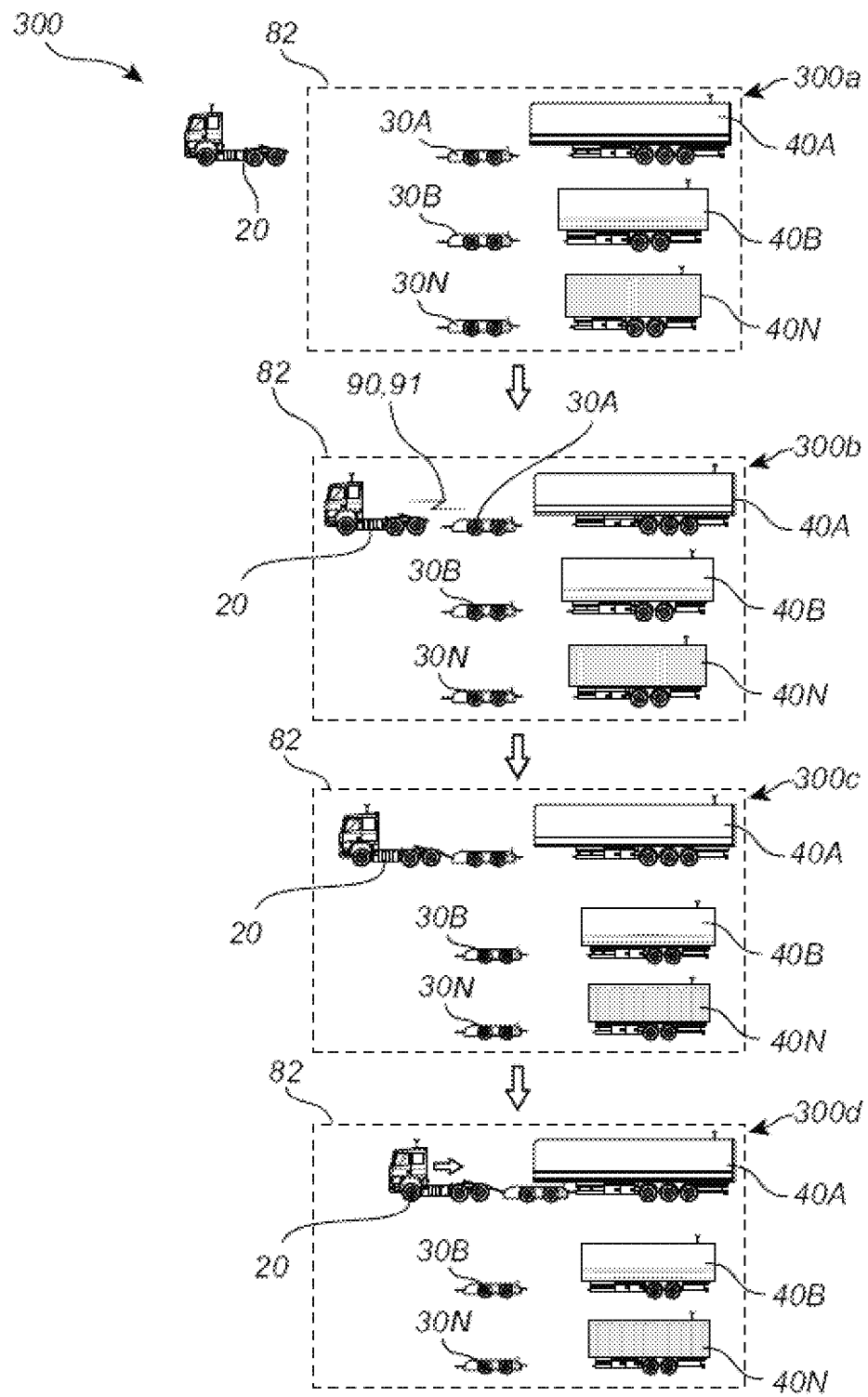
FIG. 4 schematically shows parts of a wireless control system for performing a number of operations so as to form the vehicle combination in FIG. 1 according to another example embodiment.

In FIG. 4, there is depicted another example embodiment of a number of sequences for forming a vehicle combination, as illustrated in FIG. 1, and by means of a wireless control system 90 that is operable without a control tower. Besides this difference, the wireless control system 90 is generally similar to the system described in relation to FIGS. 1 to 3. Hence, any one of the features, examples and functions as described above in relation to FIG. 2 may be incorporated into the example embodiment described below in relation to FIG. 4, unless specifically mentioned. Thus, FIG. 4 illustrates another example of a number of sequences 300, 300*a* to 300*d*, for forming a vehicle combination as described above in relation to FIG. 1. Also FIG. 4 will be described in combination with FIG. 3, which shows a flow-chart of the steps of a method performed by the wireless control system 90 for forming the vehicle combination.

In FIG. 4, the wireless control system 90 is generally defined by the control units 90*a* to 90 of the truck 20, dolly vehicles 30A to 30N and the trailers 40A to 40N. In addition, the truck 20, dolly vehicles 30A to 30N and the trailers 40A to 40N comprises all relevant components for communicating with each other, such as the transceivers and GPS tracking devices, as previously described in relation to FIG. 2.

Similar to the example in FIG. 2, the truck 20 in FIG. 4 sends a request containing a mission-characteristic for the vehicle combination when the truck 20 arrives at the geographical area 82, as indicated in 100*a*. In FIG. 4, the request is transmitted over the communication interface 90 to the group of the dolly vehicles 30A to 30N. In response to the request, the control units of the dolly vehicles transmit data to the truck 20 indicating their operational characteristics. Analogously, the control units of the dolly vehicles transmit data to the truck 20 indicating their associated distinguishable identification information. As such, the control unit 90*a* of the truck 20 obtains the operational characteristic directly from each one of the powered dolly vehicles 30A to 30N. Analogously, the control unit 90*a* of the truck 20 obtains the distinguishable identification information directly from the dolly vehicles 30A to 30N.

Alternatively, the control unit 90*a* of the truck 20 may already possess the relevant data relating to the associated distinguishable identification information and operational characteristic of each one of the dolly vehicles 30A to 30N when it arrives to the geographical area 82. For instance, the driver of the truck 20 may select to download the above data and information when receiving the mission assignment from a transport company or the like. In such example, the memory of the control unit 90*a* of the truck 20 is configured to store and contain the associated distinguishable identification information and operational characteristic of each one of the dolly vehicles 30A to 30N.

As mentioned above, the operational characteristic of each one of the dolly vehicles 30A to 30N may include a number of relevant data for making an appropriate selection, e.g. a list of the all the dolly vehicles 30A to 30N in the geographical area 82, including their capabilities in the area.

In view of this, the control unit 90*a* of the truck 20 evaluates the group of dolly vehicles 30A to 30N based on the mission-characteristics so as to determine which one of the dolly vehicles that is most capable of the mission e.g. by determining the needed brake capacity or required level of motion management. The needed brake capacity and required motion management can be determined in several different ways, as is commonly known in the art. By way of example, the needed brake capacity and required motion management can be determined based on previously entered specifications about weight of the cargo, size of the cargo and/or state of the substance of the cargo. Other possibilities of performing the evaluation are also conceivable as previously described in relation to FIG. 2.

When the evaluation is completed, as partly indicated by reference numeral 300*b* in FIG. 4, the wireless control system 90 selects the dolly vehicle among the group of dolly vehicles, based on the outcome of the evaluation. The outcome of the selection is communicated at least to the selected dolly vehicle, 30A. Subsequently, the wireless control system 90 locates the selected dolly vehicle 30A in the geographical area 82 based on the identification information. Further, in response to the evaluation and selection, the wireless control system 90 here operates the selected dolly vehicle 30A to the truck 20, as illustrated by reference numeral 300*c* in FIG. 4. The above operation generally also includes controlling the selected dolly vehicle 30A to mechanically couple to truck 20 to form the vehicle combination 10. Alternatively, the truck 20 may be operated to couple with the selected dolly vehicle in the geographical area. As illustrated by reference numeral 300*d* in FIG. 4, the wireless control system 90 then operates the coupled truck and dolly vehicle to a selected trailer 40A among the group of trailers 40A to 40N. The selection of the trailer is here performed as described above in relation to FIG. 2.

Besides the above difference that the communication is performed between the vehicles rather than via the control tower 70, the example embodiment in FIG. 4 can generally incorporate any one of the sequences, actions, and/or components described above in relation to the example embodiment in FIG. 2. The method described in relation to FIG. 3 is also applicable to the number of sequences described in relation to FIG. 4, and is thus implemented by the wireless control system 90 comprising the control units of the vehicles rather than a control system defined by the control units of the vehicles and the control tower. However, it should be noted that a combination of the example embodiments in FIG. 2 and FIG. 4 may also be conceivable. That is, in a wireless control system comprising the control units of the vehicles and the control tower, the operations performed by the wireless control system to form the vehicle combination 10 may both be performed by direct communication between the control units of the vehicles and/or by communication between the control units of the vehicles via the control tower.

Moreover, it should be noted that any one of the methods described in relation to the example embodiments in FIGS. 3 and 4 may include the step of evaluating S20 the operational characteristic of each one of the powered dolly vehicles based on the mission-characteristic by generating the dolly vehicle requirement model based on a plurality of mission-characteristics, as mentioned above, and further evaluating the operational characteristic of each one of the powered dolly vehicles by means of the dolly vehicle requirement model. Optionally, when the dolly vehicle requirement model is configured to correlate the plurality of mission-characteristics with a plurality of operational characteristics of each one of the powered dolly vehicles, the method may further comprise the step of evaluating the plurality of operational characteristics of each one of the powered dolly vehicles by means of the dolly vehicle requirement model. Such process of evaluating each one of the powered dolly vehicles may be performed by using a dolly vehicle requirement model comprising the ranking of the plurality of mission-characteristics and the ranking of the plurality of operational characteristics with respect to the received request. Subsequently, the evaluation comprises the step of assessing, for each one of the powered dolly vehicles, its agreement with the dolly vehicle requirement model, as mentioned above.

Further, it should be noted that the embodiments of the method may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

It should also be noted that the wireless control system 90, and each one of the corresponding control units 90*a* to 90*c*, may for example be an electronic control unit (ECU), comprised with the various vehicles of the vehicle combination 10, possibly manifested as a general-purpose processor, an application specific processor, a circuit containing processing components, a group of distributed processing components, a group of distributed computers configured for processing, a field programmable gate array (FPGA), etc. The wireless control system 90 and each one of the corresponding control units 90*a* to 90*c* may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Also, although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

To sum up, the example embodiments of the disclosure as described in relation to FIGS. 1 to 4 provide for selecting and identifying an appropriate dolly vehicle, and possibly an appropriate trailer, so as to form a vehicle combination as illustrated in FIG. 1, and which is suitable for performing the given mission for the vehicle combination. In forming the vehicle combination according to the above example embodiments in FIGS. 2 to 4, the dolly vehicle 30A can e.g. be connected to the rear of the first trailer 26 of the truck 20. The dolly vehicle 30A can then tow a second trailer 40.

When the vehicle combination 10 has completed its mission, the reverse procedure may be performed so as to park the dolly vehicle and the trailer in the geographical area 82. Such procedure may also be performed autonomously or via the remote-control source 70. It is also conceivable that more than one dolly vehicles can be added to a vehicle combination in order to tow more than one extra trailer unit. The concepts disclosed herein may also be extended to multiple trailers towed by one tractor. It may also be possible that the dolly vehicle may comprise one or more steerable axles for improving turning ability of the combination vehicle, since the dolly vehicle can be used to steer the trailer as the vehicle combination turns in order to reduce the total area swept by the vehicle combination.

The disclosure also relates to a computer program comprising instructions, which when executed by the processors of the wireless control system 90, cause the processors to perform operations according to the above method in FIG. 3. The disclosure also relates to a non-transitory computer-readable medium comprising instructions, which when executed by the processors of the wireless control system 90, cause the one or more processors to perform operations comprising according to the above method in FIG. 3. The disclosure also relates a vehicle, such as the truck 20, for forming a vehicle combination with a powered dolly vehicle and one or more trailers. The truck 20 comprises a memory that stores a mission-characteristic for the vehicle combination and at least one processor which uses the mission-characteristic to: select a powered dolly vehicle among a group of powered dolly vehicles based at least in part on the mission-characteristic for the vehicle combination, each one of the powered dolly vehicles having an associated distinguishable identification information and an operational characteristic; evaluate the operational characteristic of each one of the powered dolly vehicles based on the mission-characteristic; select a powered dolly vehicle among the group of powered dolly vehicles based at least in part on the evaluation; locate the selected powered dolly vehicle in the geographical area based at least in part on the identification information; and communicate the location of the selected powered dolly vehicle to the primary vehicle or operating the powered dolly vehicle to vehicle.

It may also be possible to directly select a powered trailer among the group of trailers 40A to 40N by the truck in order to form a vehicle combination by the truck 20 and e.g. the trailer 40A. Hence, in another exemplifying method, there is provided a method for selecting and identifying a powered trailer among the group of powered trailers 40A to 40N in the geographical area 82 for forming a vehicle combination with the primary vehicle 20. In generally, the method may include similar steps S10 to S50 as the method described in relation to FIG. 3, besides that the method here is configured to merely select a powered trailer rather than a power dolly vehicle. In other words, the method for selecting and a powered trailer is also implemented by one or more processors of the wireless control system 90, in particular the processors of any one of the truck 20, the powered trailers and the control tower. In addition, in this exemplifying method, each one of the powered trailers has an associated distinguishable identification information and an operational characteristic. By way of example, the powered trailer associated operational characteristic may comprise data indicating any one of a brake capacity of the powered trailer, energy storage system capacity of the powered trailer, and a state of charge (SOC) of the energy storage system of the powered trailer. In addition, or alternatively, the powered trailer associated operational characteristic may comprise data indicating type of powered trailer. Such data may refer to the configuration of the powered trailer, the type of propulsion system of the powered trailer, the wheelbase of the powered trailer, the dimensions of the powered trailer, and the weight of the powered trailer.

Typically, the powered trailer associated distinguishable identification information may comprise an identification component configurable to be updated by the one or more processors of the wireless control system. The identification component comprises data capable of distinguishing each one of the powered trailers from each other. The identification component may e.g. refer to a manufacturing ID, the ownership of the powered trailer and/or a technical specification of the powered trailer.

The exemplifying method comprising: receiving a request from the primary vehicle to select a powered trailer among the group of powered trailers based at least in part on a mission-characteristic for the vehicle combination; evaluating the operational characteristic of each one of the powered trailers based on the mission-characteristic; selecting a powered trailer among the group of powered trailers based at least in part on the evaluation; locating the selected powered trailer vehicle in the geographical area based at least in part on the identification information; and communicating the location of the selected powered trailer to the primary vehicle.

In an example when the primary vehicle is an autonomous truck, the method here comprises the step of operating the autonomous truck to the powered trailer, e.g. by the wireless control system. Subsequently, the autonomous truck is operated to couple with the powered trailer. The above exemplifying method can be implemented by a wireless control system 90 as described above in relation to FIGS. 1 to 4, in particular by the control unit 90a comprised with the truck 20 and the control unit comprised with the powered trailer. In addition, the above exemplifying method may be combined with any one of the example embodiments, features and functions as described in relation to example embodiments of FIGS. 1 to 4.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. For example, the generalization of the present vehicle combinations to include additional vehicles, as described above, remains within the scope of the present invention. Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for selecting and identifying a powered dolly vehicle for forming a vehicle combination, the method comprising:

receiving, by a wireless control system, a request from a primary vehicle to select a powered dolly vehicle among a group of powered dolly vehicles based at least in part on a mission-characteristic for a vehicle combination with the primary vehicle and one or more trailers;

evaluating, by the wireless control system, an operational characteristic of each one of the powered dolly vehicles based on the mission-characteristic;

selecting, by the wireless control system, a powered dolly vehicle among the group of powered dolly vehicles based at least in part on the evaluation;

locating, by the wireless control system, the selected powered dolly vehicle in a geographical area based at least in part on identification information associated with the selected powered dolly vehicle; and communicating, by the wireless control system, the location of the selected powered dolly vehicle to the primary vehicle or communicating, by the wireless control system, commands to move the powered dolly vehicle to the primary vehicle, wherein, based on the communication by the wireless control system, the primary vehicle and the powered dolly are coupled together to form the vehicle combination.

2. The method of claim 1, further comprising:

selecting one or more trailers among a group of trailers based at least in part on the mission-characteristic for the vehicle combination and the selected powered dolly vehicle;

communicating the location of the selected one or more trailers to the powered dolly vehicle, or to the primary vehicle; and operating the powered dolly vehicle to couple with the one or more trailers.

3. The method of claim 1, wherein the mission-characteristic of the vehicle combination comprises at least one of:
an assignment instruction for the vehicle combination;
a cargo space-requirement for the vehicle combination;
a pick-up location of the cargo;
a pick-up time for the cargo;
a delivery time for the cargo;
a delivery location of the cargo; and
data indicating type of cargo.

4. The method of claim 1, wherein the mission-characteristic of the vehicle combination comprises data indicating type of primary vehicle.

5. The method of claim 1, further comprising receiving data relating to environmental conditions.

6. The method of claim 1, wherein the associated operational characteristic comprises data indicating at least one of:
a brake capacity of the powered dolly vehicle;
a brake system of the powered dolly vehicle;
an energy storage system capacity of the powered dolly vehicle;
a state of charge of the energy storage system of the powered dolly vehicle; and
a steering system of the powered dolly vehicle.

7. The method of claim 1, wherein the associated operational characteristic comprises data indicating type of powered dolly vehicle.

8. The method of claim 1, wherein the associated distinguishable identification information comprises an identification component configurable to be updated by the one or more processors of a wireless control system.

9. The method of claim 1, wherein the evaluating comprises determining if at least one operational characteristic of at least one of the powered dolly vehicles fulfils the mission-characteristic, or is at least sufficient for fulfilling the mission-characteristic.

10. The method of claim 1, wherein evaluating the operational characteristic of each one of the powered dolly vehicles based on the mission-characteristic comprises generating a dolly vehicle requirement model based on a plurality of mission-characteristics, and further evaluating the operational characteristic of each one of the powered dolly vehicles by means of the dolly vehicle requirement model.

11. The method of claim 10, wherein the dolly vehicle requirement model is configured to correlate the plurality of mission-characteristics with a plurality of operational characteristics of each one of the powered dolly vehicles, the method further comprising evaluating the plurality of operational characteristics of each one of the powered dolly vehicles by means of the dolly vehicle requirement model.

12. The method of claim 10, wherein the dolly vehicle requirement model further comprises a ranking of the plurality of mission-characteristics.

13. The method of claim 10, wherein the dolly vehicle requirement model further comprises a ranking of a plurality of operational characteristics with respect to the received request.

14. The method of claim 10, further comprising assessing, for each one of the powered dolly vehicles, an agreement with the dolly vehicle requirement model.

15. The method of claim 1, wherein the request is received at a remote-control source from the primary vehicle, the remote-control source comprising a transceiver for receiving the request from the primary vehicle.

16. The method of claim 15, wherein the remote-control source comprises a memory configurable to contain and store the associated distinguishable identification information and operational characteristic of each one of the powered dolly vehicles.

17. The method of claim 15, further comprising receiving the request from the primary vehicle at the remote-control source when the primary vehicle arrives at the geographical area.

18. The method of claim 1, wherein the primary vehicle comprises a memory configurable to contain any one of the associated distinguishable identification information and operational characteristic of each one of the powered dolly vehicles.

19. The method of claim 1, further comprising obtaining the operational characteristic directly from the powered dolly vehicles.

20. The method of claim 1, further comprising controlling any one of the primary vehicle and the selected powered dolly vehicle to couple to each other so as to form the vehicle combination.

21. A wireless control system, comprising:
a memory that stores a set of instructions; and
one or more processors which use instructions from the set of instructions to:
receive a request from a primary vehicle to select a powered dolly vehicle among a group of powered dolly vehicles based at least in part on a mission-characteristic for a vehicle combination with the primary vehicle and one or more trailers;
evaluate an operational characteristic of each one of the powered dolly vehicles based on the mission-characteristic;
select a powered dolly vehicle among the group of powered dolly vehicles based at least in part on the evaluation;
locate the selected powered dolly vehicle in a geographical area based at least in part on identification information associated with the selected powered dolly vehicle; and communicate the location of the selected powered dolly vehicle to the primary vehicle or communicating, by the wireless control system, commands to move the powered dolly vehicle to the primary vehicle, wherein, based on the communication by the wireless control system, the primary vehicle and the powered dolly are coupled together to form the vehicle combination.

22. The wireless control system of claim 21, further comprising a communication interface operably coupled to the one or more processors for receiving instructions and for transmitting the location of the selected powered dolly vehicle to the primary vehicle.

23. A vehicle for forming a vehicle combination with a powered dolly vehicle and one or more trailers, comprising:
   a memory that stores a mission-characteristic for the vehicle combination; and
   one or more processors which use the mission-characteristic to:
      select a powered dolly vehicle among a group of powered dolly vehicles based at least in part on the mission-characteristic for the vehicle combination, each one of the powered dolly vehicles having associated distinguishable identification information and an operational characteristic;
      evaluate the operational characteristic of each one of the powered dolly vehicles based on the mission-characteristic;
      select a powered dolly vehicle among the group of powered dolly vehicles based at least in part on the evaluation;
      locate the selected powered dolly vehicle in a geographical area based at least in part on the identification information; and
      communicate the location of the selected powered dolly vehicle to the primary vehicle or communicating, by the wireless control system, commands to move the powered dolly vehicle to the primary vehicle,
   wherein, based on the communication by the wireless control system, the primary vehicle and the powered dolly are coupled together to form the vehicle combination.

* * * * *